Figure 11:
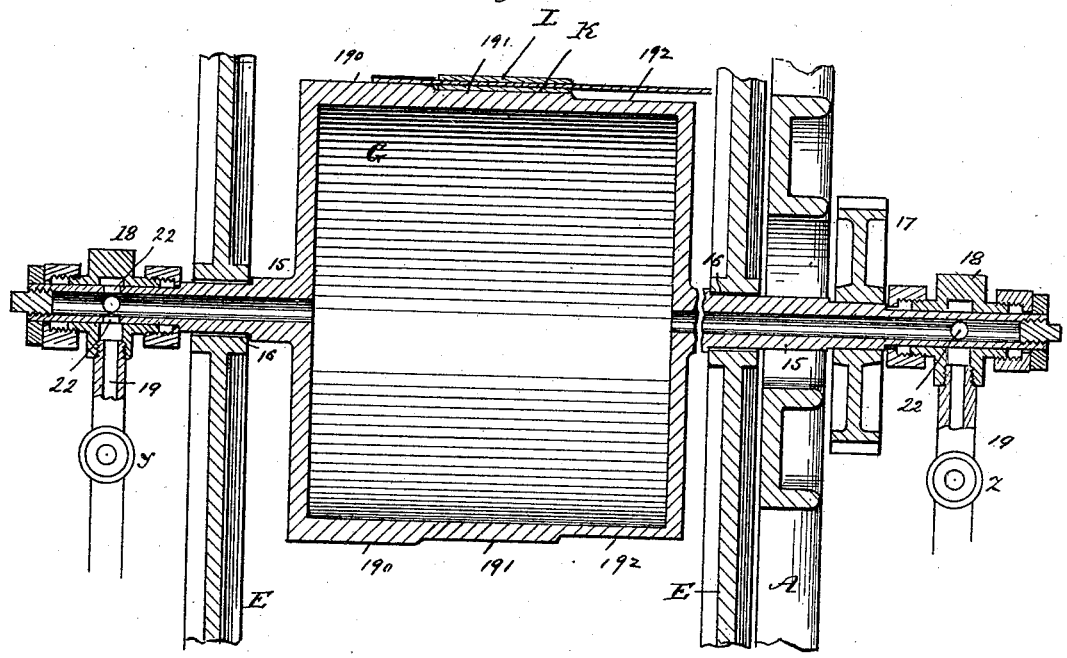

(No Model.) 7 Sheets—Sheet 1.
C. H. HEYWOOD.
ENVELOPE MACHINE.
No. 416,105. Patented Nov. 26, 1889.
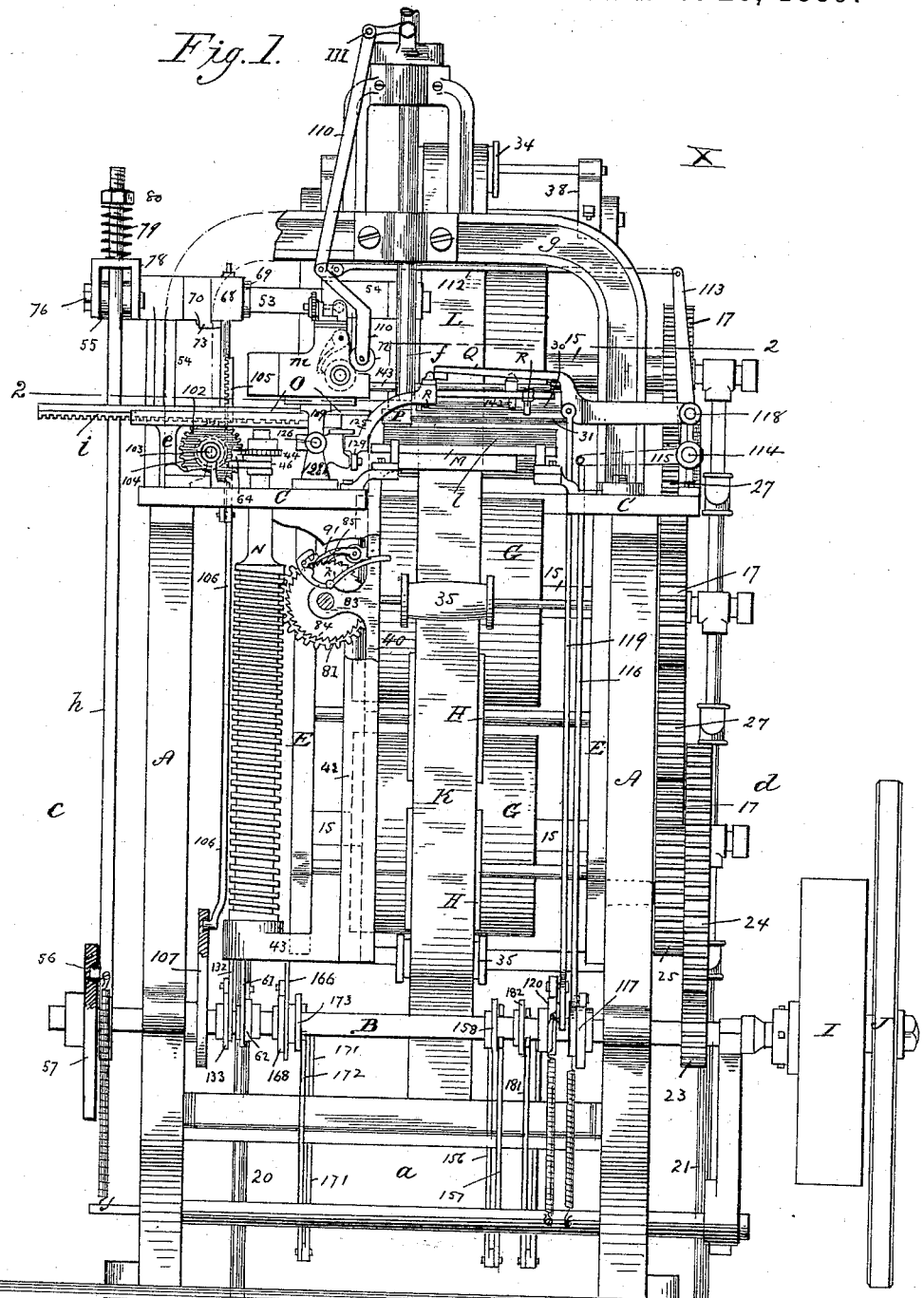
Fig. I.
Witnesses
Wm. F. Bellows
G. W. Chamberlain.
Inventor,
Chas. H. Heywood,
By his Attorneys

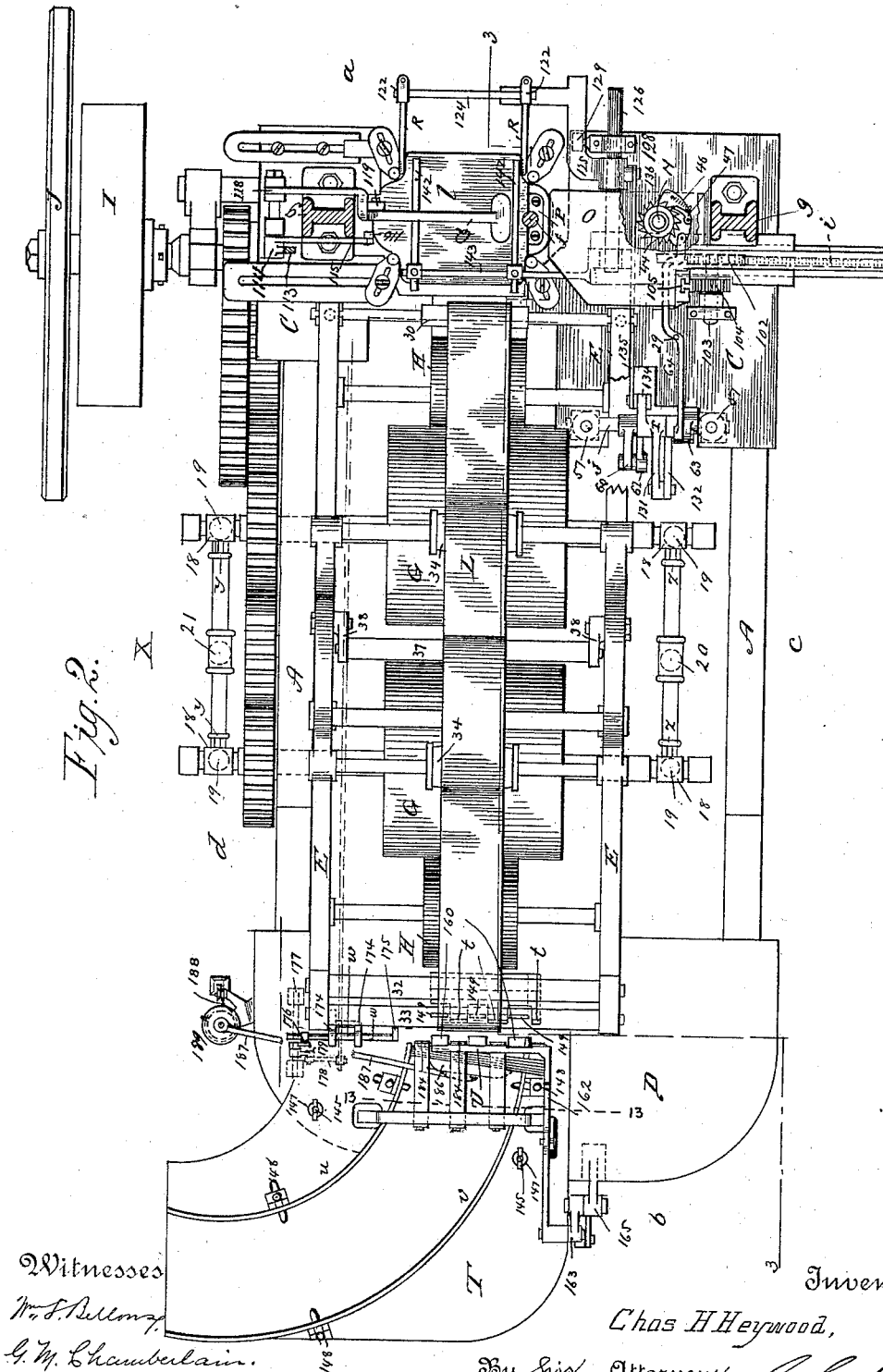

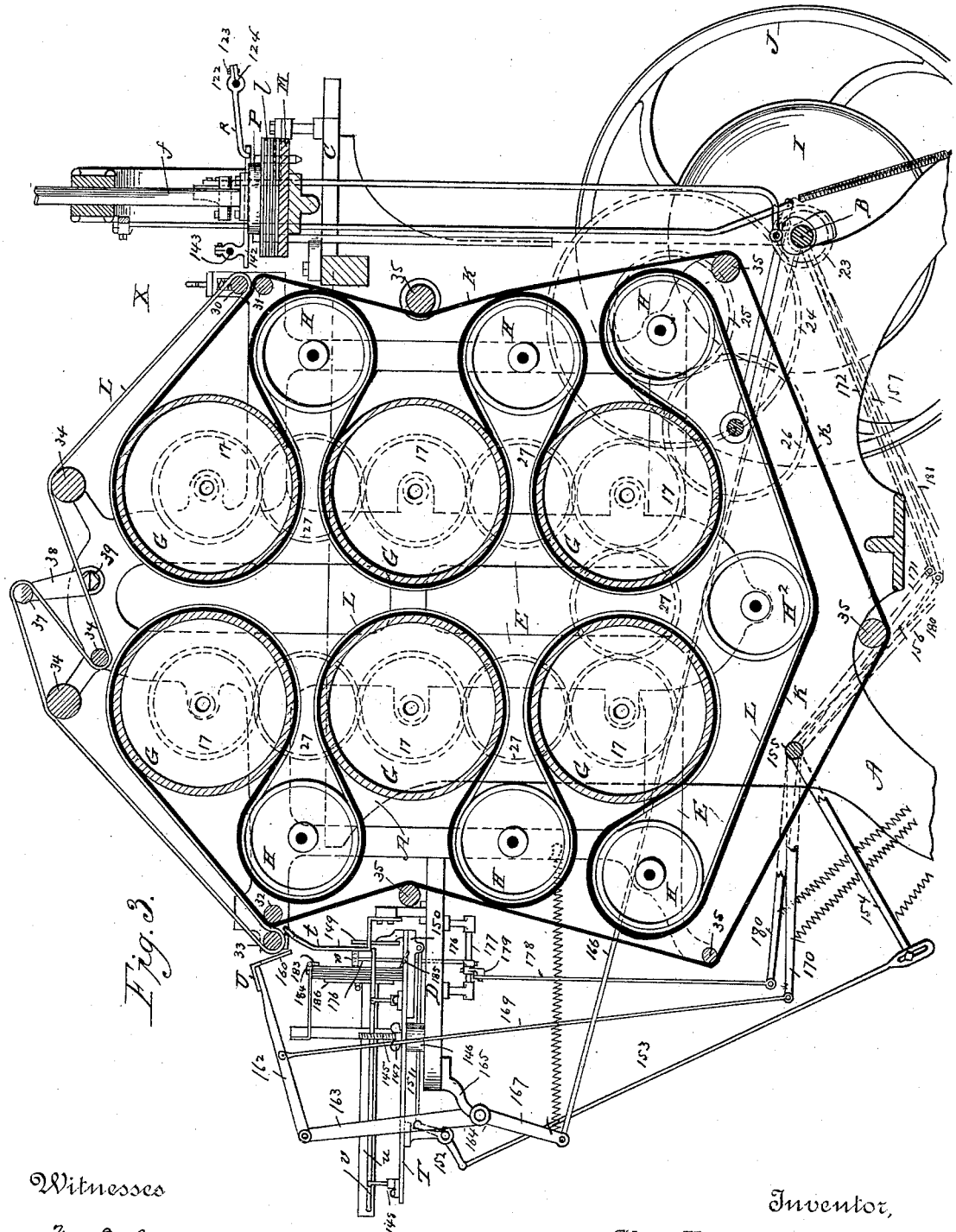

(No Model.)
C. H. HEYWOOD.
ENVELOPE MACHINE.
No. 416,105.
7 Sheets—Sheet 4.
Patented Nov. 26, 1889.
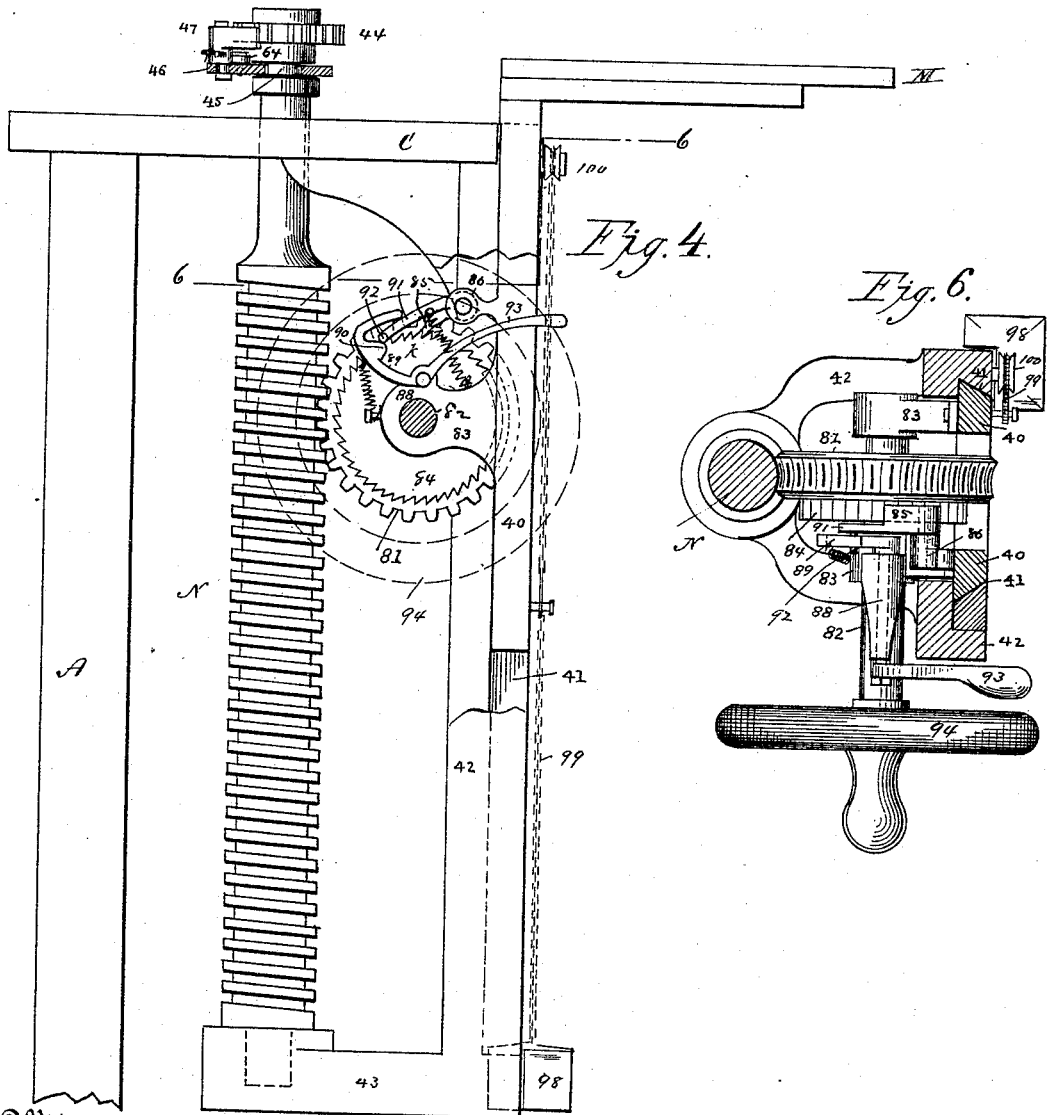
Witnesses
Wm. S. Bellows
G. M. Chamberlain
Inventor,
Chas. H. Heywood,
By his Attorneys (No Model.)
C. H. HEYWOOD.
ENVELOPE MACHINE.
No. 416,105. Patented Nov. 26, 1889.
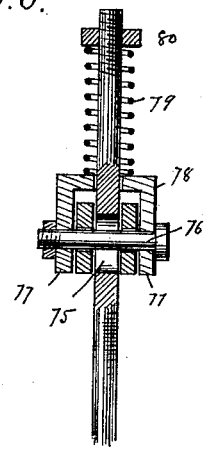
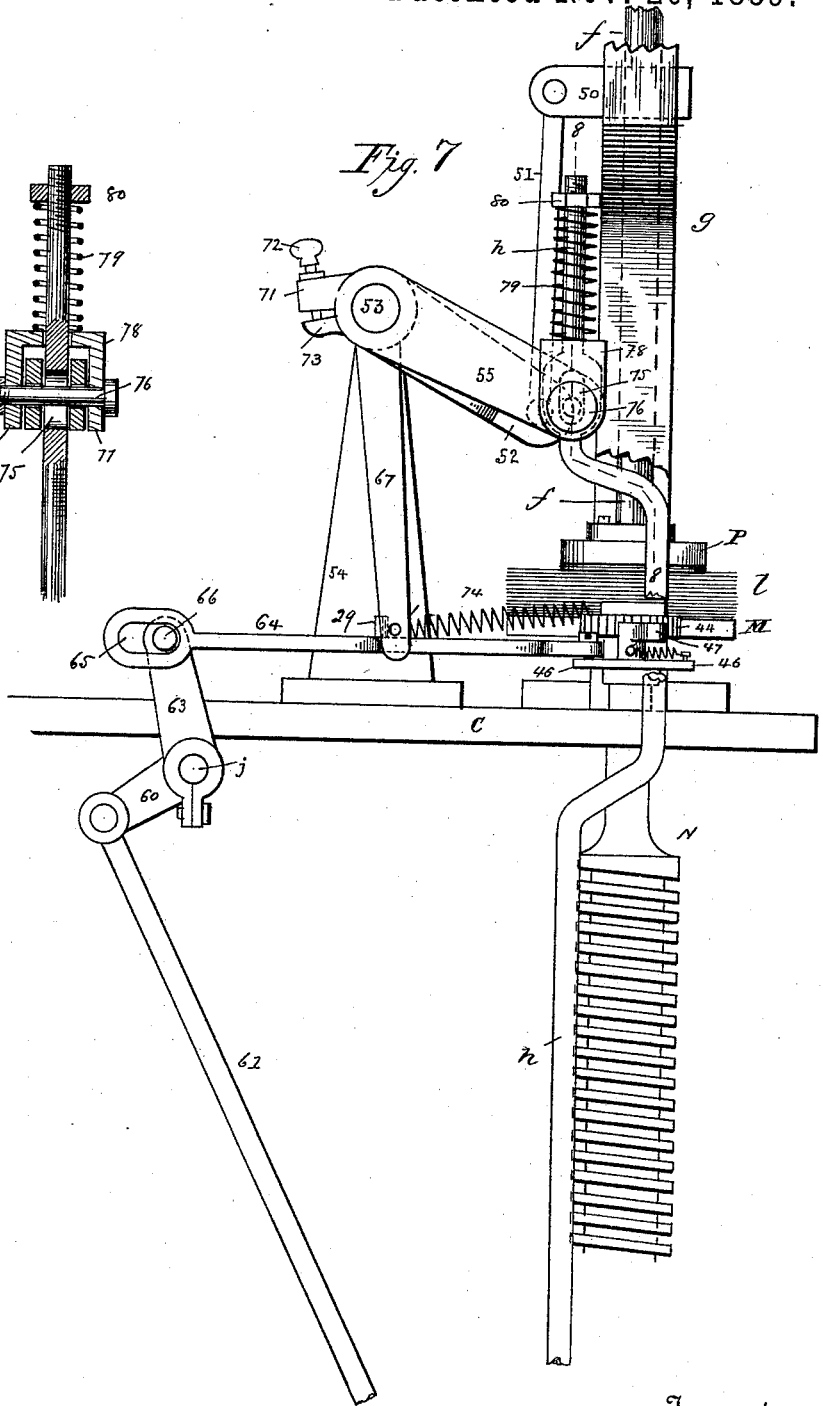
Witnesses
W. S. Bellamy
G. M. Chamberlain.
Inventor,
Chas. H. Heywood,
By his Attorneys,

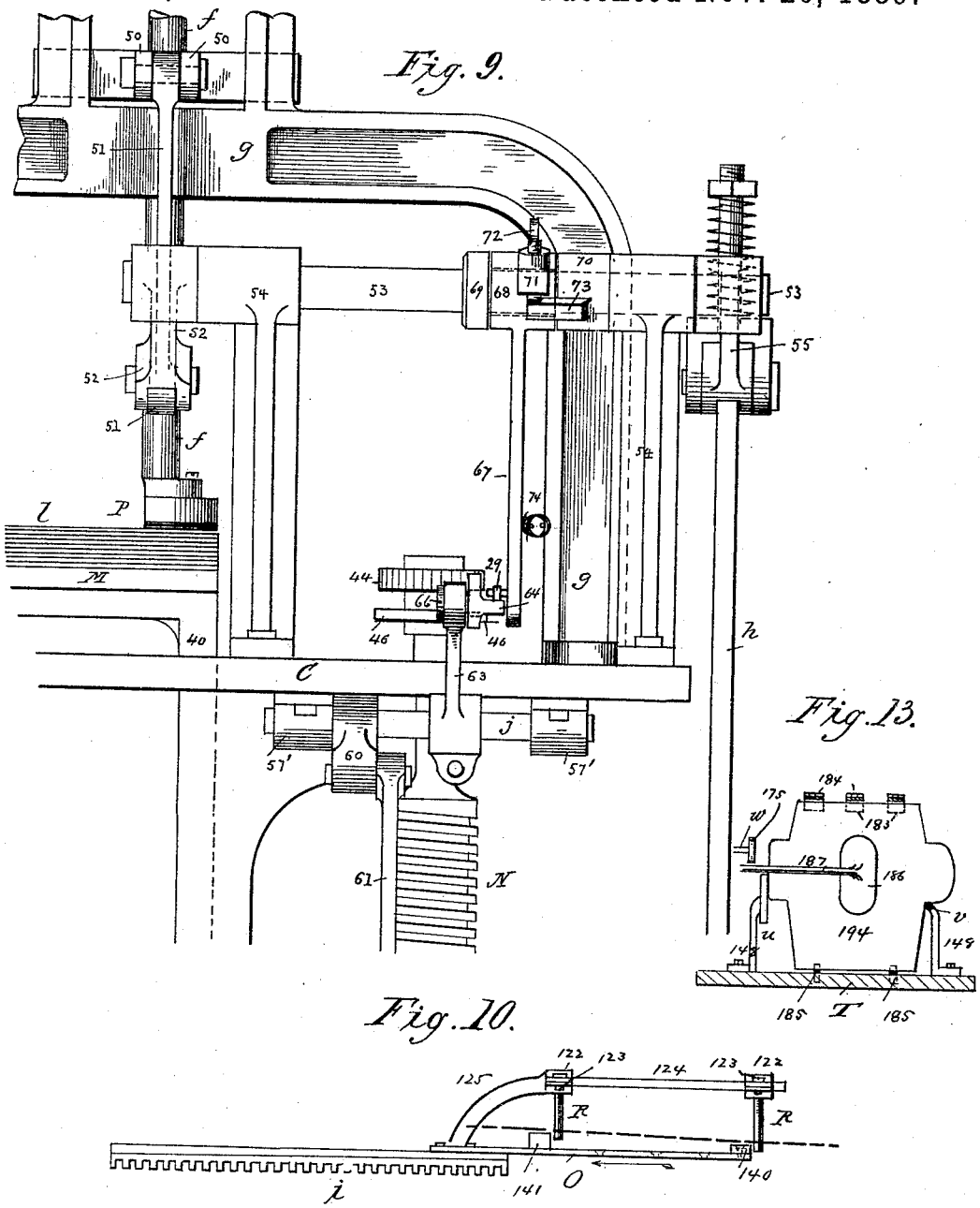

(No Model.)　　　　　　C. H. HEYWOOD.　　　7 Sheets—Sheet 7.
ENVELOPE MACHINE.

No. 416,105.　　　　　　　　Patented Nov. 26, 1889.

Witnesses
Wm. F. Bellows
G. M. Chamberlain.

Inventor,
Chas. H. Heyward,
By his Attorneys,

UNITED STATES PATENT OFFICE.

CHARLES H. HEYWOOD, OF SPRINGFIELD, MASSACHUSETTS, ASSIGNOR TO P. P. KELLOGG & CO., OF SAME PLACE.

ENVELOPE-MACHINE.

SPECIFICATION forming part of Letters Patent No. 416,105, dated November 26, 1889.

Application filed May 25, 1888. Serial No. 275,073. (No model.)

*To all whom it may concern:*

Be it known that I, CHARLES H. HEYWOOD, a citizen of the United States, of America, residing at Springfield, in the county of Hampden and State of Massachusetts, have invented new and useful Improvements in Envelope-Machines, of which the following is a specificaion.

As well known in the manufacture of envelopes by machinery, in some instances it is desirable to first gum and dry the seal-flaps of the blanks from which the envelopes are formed, after which the so gummed and dried blanks are placed in an envelope-machine, by which they are gummed on their other flap or flaps and such flaps folded and secured the one upon the other for the completion of the envelope.

The present invention relates to a machine for gumming the seal-flaps of envelope-blanks and for drying same before the delivery thereof, whereby the blanks from a pile may be in rapid succession gummed by a picker conveyed to and around one or more drier-drums and discharged, all in such a manner that such blanks may be gummed over the whole or as much as desired of the area of their seal-flaps, and so that the said gummed seal-flaps will not curl or roll, and the present machine is so provided with adjustable and interchangeable parts that it may be made capable of gumming and drying blanks of different sizes, and also of different shapes; and the machine of the present invention comprises, as the principal instrumentalities thereof, a new and improved mechanism for automatically operating and controlling the envelope-blank-supporting table to maintain it so that the top of a pile of blanks thereon will always be practically in the same relation to the limit of the downward thrust of the picker, and also the construction of parts on and in relation to the slide for the envelope-blank-supporting table, whereby the said table may be raised or lowered, as desired, independently of the hereinabove-mentioned automatic mechanism; the arrangement of and mechanism for operating a separator-slide plate or frame for its projection under a single blank lifted from the pile by the picker; devices for pushing the blank to the engagement therewith of the carrying-tapes; means for securing the driving of the drums and for the introduction into and exhaust from said drums of steam, and also devices for receiving the gummed blanks on their discharge from the drier-drums and maintaining them in a regular bunch or pile; and the invention consists in other constructions and combinations of parts, all substantially as will be hereinafter fully shown, described, and pointed out in the claims.

In the accompanying sheets of drawings the present invention is illustrated, in which similar characters of reference indicate corresponding parts in all the views.

Figure 12:
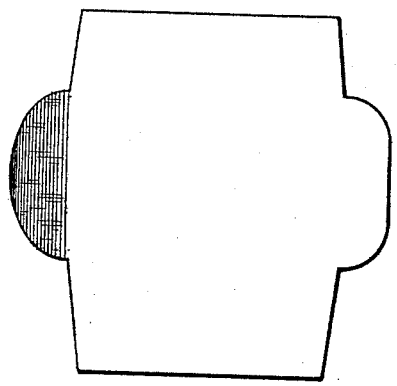

Figure 1 is a front elevation of the machine with a portion of the front arch broken away for better illustration, the picker being shown as in its lowermost position and other parts in their corresponding relations therewith and with each other. Fig. 2 is a plan view of the machine with some parts at the front end thereof above the horizontal line 2 2, Fig. 1, removed. Fig. 3 is a longitudinal vertical section of the machine substantially on the line 3 3, Fig. 2. Fig. 4 is an enlarged front view of the envelope-blank-supporting table and its elevating mechanism. Fig. 5 is a plan view of a portion of Fig. 4, and Fig. 6 is a horizontal section of Fig. 4 on the line 6 6. Fig. 7 is an enlarged side elevation of the mechanism for operating the elevator worm-screw; and Fig. 8 is a detail sectional view on the line 8 8, Fig. 7. Fig. 9 is a view of the parts shown in Fig. 7, taken at the rear thereof and at right angles thereto. Fig. 10 is a front view, in detail, of the separator-slide. Fig. 11 is a vertical section from end to end through one of the steam-drums and also through its bearings and steam-connections. Fig. 12 is plan of an envelope-blank, showing same as being gummed on its seal-flap; and Fig. 13 is a view of some of the parts to be hereinafter referred to, as seen forward of the line 13 13, Fig. 2.

X represents the machine of the present invention, of which *a* is the front end; *b*, the rear end; *c*, the front side, and *d* the rear side;

and it comprises a suitably-formed main or outer frame A, on which the main shaft B is transversely supported at the lower front end thereof, and on the upper side of which frame is secured the front table C, and also at the rear end a table D, for maintaining parts to be hereinafter described, and also an inner frame E, which supports and forms bearings for the drier-drums G and guiding-rolls for the carrying-tapes K and L. Upon the main shaft B are secured the driving and balance wheels I and J, and also a series of cams, to be hereinafter particularly referred to as to their respective purposes.

The present series of drier-drums shown consists of six chambered cylinders G, arranged in two sets of three each, with their axes parallel and in two vertical parallel planes, as indicated in the drawings, and as particularly shown in Fig. 11 each drum G is provided at its heads with outwardly-extended hollow axial hubs 15, closed at their outer ends, passing through bearings 16 of the inner frame, on one of which is secured a spur-gear 17, and each hollow hub is passed through and has a close rotatable bearing within a chambered box 18, which is rigidly supported at the upper end of a pipe 19, which said pipe 19 at each end of each drum is a branch of a common vertical pipe 20 at the front side and 21 at the rear side, the former being a steam-supply and the latter an exhaust pipe. The extended tubular hubs within the chambered boxes 18 are provided with one or more ports 22, whereby communication for the steam may be had from the steam-supply pipe 20 through the branch 19 at one end of the drum into and through the chambered box to and through the one end tubular hub to the drum-chamber, the exhaust passing thence through the similarly-constructed passages to the common exhaust-pipe 21. Suitable cocks may be provided, as at $y$ and $z$, to regulate the supply of steam into said cylinders and the exhaust-steam therefrom, as desired. A uniform rotation in the same direction is imparted to all the drums G of the series by the train of gearing, the arrangement of which will be seen on reference to Figs. 1 and 3, where 23 represents a pinion on the main shaft meshing with a gear 24, carried on a stud fixed to the frame-work, there moving in consonance with and by said gear 24 on said stud in an offset plane a gear 25, meshing into a gear 26, which is intermediate thereof, and the gear 17 of the lower and foremost drum G, and intermediate gears 27 between the drums of each vertical set and between opposite drums of the front and rear sets complete the train. At the front of each of the front sets and at the rear of each of the rear sets of drums, with their axes parallel, is an idler drum or roller H, and there is also below and between the sets of drums G another idler-drum $H^2$. At the front of the machine is a pair of feed-rollers 30 and 31, with their axes in a vertical plane, and at the rear of the machine is also a pair of rollers 32 and 33, with their axes in a horizontal plane, and above the drums are guide-rollers 34, more or less in number, as desired, and in any suitable arrangement, and below and forward and back of said drums are guide-rollers 35. The two endless tapes K and L are disposed together about the drums G and idlers H $H^2$, the one L also passing around the rollers 30 and 33 and over the upper guide-rollers 34, while the one K passes also over the feed-rolls 31 and 32 and the guide-rolls 35, all so that if an envelope-blank is entered by its intermediate portion between the tapes at the rollers 30 31, to the former of which a suitable pressure is given by providing spring-bearings therefor, with its seal-flap projected beyond the edges of the carrying-tapes with its gummed side uppermost, it will thence pass over the upper drum G of the front set, with each gummed edge away from the face of the drum, thence over the idler H, which is narrower than the drum, whereby the gummed side of the projected flap, which is then faced toward the periphery of said idler, will not come in contact therewith, and so on, successively passing around the narrow idlers and the wider drums, with the gummed face of its flap faced away from such drums, until it is discharged at the point between the rolls 32 33, where the tapes in their travel separate the one from the other, portions thereof, however, coming together again between the rollers 30 and 31, all as will be clearly understood on reference to Fig. 3.

A tightener-bar 37, carried at each end by swinging arms 38, adjustably secured by bolts, as at 39, on the frame E, as shown, will take up any slack in one of the tapes, while a similarly-adjusted bar (not shown) is preferably provided at a suitable part of the machine for keeping the other tape taut.

The picker P is removably attached to the lower end of the vertical plunger-shaft $f$, having bearings for a vertical play in and through the arched frame $g$, supported from the front table.

To the projecting lugs of a strap-yoke 50 one end of a link 51 is pivotally secured, to the other end of which is pivotally connected the outer end of a radial lever 52, rigidly fastened in a horizontal rocker-shaft 53, mounted in standards 54. At the outer end of the rocker-shaft, projected to the front side of the machine, there is rigidly secured another radial arm 55, with the outer end of which is connected the upper end portion of a connecting-rod $h$, the lower end of which engages with the cam-groove 56 in the usual irregular-shaped picker-actuating disk 57, rotating on and with the main shaft B.

M represents the horizontal blank-supporting table carried at the upper end of vertical slide-uprights 40, having beveled edges capable of movement in dovetailed and gibbed ways 41 of a vertical frame 42, fixed to and suspended from the front table C. The said blank-supporting table, as usual in envelope-machines, is by automatic mechanism, to be now described, during the operation of the machine maintained at such a height in relation to the limit of the downward thrust of the picker as to always present the top of the pile of blanks on said table just within the reach and subject to the abstracting action of the picker.

N represents a vertical worm-screw shaft projecting by its upper end portion through and having a bearing in the front table C, and having a bearing by its lower end in a lateral extension 43 of the frame 42. At the upper end of said worm-screw shaft is fixed a ratchet-wheel 44, below which, loosely embracing the contracted neck 45 of the screw-shaft, is a swinging plate 46, on the face of which is pivoted a spring-pallet 47.

On a horizontal rocker-shaft $j$, supported in bearings in brackets 57', hung from the front table, is a crank-arm 60, to the outer end of which is secured the upper end of a connecting-rod 61, the lower end of which is in engagement with the cam 62 on the main shaft, whereby an oscillating motion or roll is given to the said rocker-shaft $j$, which, through the resulting backward and forward throw of the crank-arm 63 on said rocker-shaft, imparts a vibratory movement to a connecting-rod 64 between the end of said crank-arm and said swinging plate 46, and on each rotation of the main shaft, through the mechanism just described, the pallet carried by said swinging plate is given a forward thrust a fixed distance in the direction of the arrow, Fig. 5, and then recedes a certain distance in the opposite direction. By the adjustment of the parts and connections between the cam 62 and the swinging pallet-plate the resulting backward or retracing movement of said carrying-plate is of an extent less than enough to carry the tooth of the pallet to or beyond the relatively next rearward tooth of the ratchet-wheel 44. The connection of the said rod 64 with the crank-arm 63 is to be substantially as shown in Fig. 7, consisting of a longitudinal slot 65, embracing a stud 66, fixed in the end of the crank-arm, and intermediate of its length the connecting-rod 64 is provided with a pin 29, in proximity with which extends the lower end of a radial arm 67 of a sleeve 68, loosely surrounding the rocker-shaft 53, held against longitudinal movement thereon by the collars 69 and 70, fixed on said shaft. The sleeve 68 is provided with a radially-extending horn 71, preferably provided with an adjustable abutment comprised in a screw 72, and the fixed collar 70 of the rocker-shaft also has a radially-extending horn 73, which projects to intersect the plane of rotation of the sleeve-horn 71. (See Fig. 9.) A spring, as 74, is to be applied in relation to the radial arm 67 or the sleeve 68, so that the horn 71 of the latter will normally be held toward the horn 73 of the collar 70, and the lower end of the radial arm will lie forward of the position of contact with the connecting-rod pin 29. (Seen in Fig. 7.)

As will be seen in Figs. 1, 7, 8, and 9, the connecting-rod $h$ from the picker-cam 57 to the radial arm 55 has provided at the upper end portion an elongated slot 75, through which the pin 76 loosely passes, as also through the ear-pieces 77 of a stirrup-frame 78 and through the bifurcated end portions of the radial arm 55. The upwardly-extending end of the rod $h$ receives a stiff coiled spring 79, which is confined between the nut or collar 80 and the top of the stirrup-frame, so that normally the lower end of the slot will lie against the pin 76, as indicated in dotted lines, Fig. 7, and the action of such spring in relation to the described parts is such that under less than a given and considerable downward pressure or strain upon the rod $h$ the relations of said rod $h$ and end of lever 55 are constant, they then moving in unison; but with an excessive downward strain on the said rod $h$ said rod may move downwardly without effect on the lever 55, then securing a compression of the spring 79, its slot passing over the pin 76.

A worm wheel 81, fixed on an arbor 82, supported in bearings in laterally-extended brackets 83 of the elevator-table upright slides 40, is arranged to have its teeth engage the threads of the screw N and rigidly attached to said arbor to rotate in unison therewith, and with said worm-wheel is a ratchet-wheel 84, with which, however, a spring-pawl 85, pivoted in a bracket 86 of one of the slide-uprights, engages, so that when the pawl is in place the worm-wheel is as a rigid projection on and from the slide-uprights engaging with the threads of the worm-screw N. A two-armed lever $k$, intermediately pivoted on one of the brackets 83, as at 88, has the outer end of its one arm 89 provided with an inclined face 90, bearing against the cross-pin 92 on the arm 91, which is an extension of the pawl 85, and its other arm 93 extends into proximity with the rim of a hand-wheel 94 on the outer end of the worm-wheel arbor. By grasping the hand-wheel and by the thumb depressing the lever-arm 93 the pawl is released from the ratchet-wheel 84, and by turning the hand-wheel in either direction the blank-supporting-table slide may be either raised or lowered, as desired, the worm-wheel then running over the threads of the worm-screw, these parts in this connection acting in the manner of a pinion and rack-bar and independently of the movement of the slide for the blank-supporting table, produced by the described mechanism interposed between the picker-plunger and the ratchet 44 on the worm-shaft, the operation of which latter-mentioned mechanism will be now described.

With a pile of blanks $l$ placed on the table M, with the top thereof at the highest point desired, on the descent of the connecting-rod $h$, actuated by the picker-cam 57, through the rocker-shaft, double radial arms, and link-connection described, the gummed picker will be carried down to a firm rest on the blank, when the downward swing of the radial arms will cease, the connecting-rod $h$ continuing downward for its full throw with the cam, its slot 75 passing downwardly over the pin 76. As the pile under successive descents of the picker is lowered, each downward throw of the connecting-rod $h$ carries the radial arm 55 (and through the oscillation of the rocker-shaft the rigid radial arm 52) still farther downward, before, by the abutment of the picker against the pile, the downward throw of such arms and the oscillation of the rocker-shaft are limited, and when the consequent increased oscillation of the rocker-shaft is sufficient to carry its horn 73 far enough to force the horn 71 on the sleeve 68 such a distance as to cause its arm 67 to move rearwardly, so that its end will strike against the abutment 29 on the connecting-rod to force it rearwardly far enough to swing the pallet-carrying plate rearwardly, whereby the end of the pallet thereon will be carried to an engagement with a next rear tooth on the worm-screw ratchet 44 on the then forward throw of the crank-arm 63 on the rocker-shaft $j$, (caused by the connection described with the properly-adjusted cam on the main shaft.) The connecting-rod 64 is moved forward, moving the carrying-plate and pallet forward to turn the worm-screw shaft the distance corresponding to the length of one of its ratchet-teeth.

It will be understood that under the successive movements of the picker and the last-described parts moving in conjunction therewith between the times the pile is at its utmost height and lowered sufficiently to necessitate the picker descending, so that the arm 67 will force, through the connecting-rod 64, the pallet rearwardly to take a new tooth, each forward throw of the radial arm 63 will force the connecting-rod 64 forward to a certain and uniform limit, the backward throw of such rod 64 increasing as the successive rearward throws of the radial arm 67 increase under the lowering of the pile, as will be plain, and the pallet will, by the corresponding movement of its carrying-plate during these intermediate reciprocations, move backward and forward on the face of the worm-ratchet tooth without effect thereon, until its backward movement is of such an extent that it engages the back of the tooth when the forward throw of the pallet turns the screw slightly. Obviously through the engagement with one or more of the teeth of the worm-wheel with the worm-screw threads, (which wheel in this connection is, in substance and effect, merely a rigid engaging projection from the platen-elevator slide,) on the turning of the worm-screw the blank-supporting table is raised. A counter-weight 98, by a chain or cord 99, guided over a pulley 100 on the frame 42 and secured to one of the uprights, relieves the weight of the platen-slide and the parts supported thereby, so that on releasing the pawl 85 and turning the hand-wheel 94 the platen may be readily and easily moved up or down as great a distance as desired within its limits.

The separator-slide plate O is secured on a horizontal racked bar $i$, guided for a reciprocating movement at right angles to the direction of travel of the carrying-tapes K L in suitable slideways of an upright $e$, and, with said rack-bar, engages a spur-gear 102, carried on a horizontal shaft 103, on which is fixed a pinion, as indicated at 104, and a suitably-guided vertical rack-bar 105 meshes with said pinion, which bar is secured to a connecting-rod 106, engaging the cam 107 on the main shaft, all so that at the time the picker rises to lift an envelope-blank from the pile said plate is moved under the lifted blank and withdrawn therefrom just before the next descent of the picker.

$m$ represents the gum-box supported on a stand 109, in which is the usual gum-roll, to be rotated by any suitable intervening mechanism between it and the main shaft, and $n$ represents the picker-gumming roller hung in journals at one end of a frame 110, which is rigid between said journals and its pivotal point 111 at the upper part of the upright arch frame $g$, intermediate of the height of which frame 110 is pivoted one end of a connecting-rod 112, the other end of which is pivotally attached to one arm 113 of a bell-crank lever intermediately pivoted, as at 114, to the other arm 115 of which bell-crank lever the upper end of a rod 116 is connected, which rod is in engagement with the cam 117, and the rigid frame is, under the connections described, at the time of each raising of the picker reciprocatingly moved to carry the gum-roller against the face of the picker to gum it.

Q represents a detacher-arm, its free end being preferably faced with rubber or other yielding material, said arm being pivoted at its end 118, and intermediate of its length is attached one end of rod 119, in engagement with the cam 120 on the main shaft. When the picker has been raised, carrying a blank upwardly, and the separator-slide O has been projected thereunder, the detacher-lever, by its free end, which is in proximity to the line of travel of the picker, is moved downward to force the blank from its adhesion to the picker. While the blank, detached, as aforesaid, from the picker, rests upon the separator-slide—which preferably is allowed to momentarily pause between its forward projection and its return-throw—one or more pusher-fingers R are caused to move at right angles to the throw of the separator-slide and in the line of travel of the carrying-tapes, to force the blank inwardly, so that its inner edge will be carried between the converging tapes between the rollers 30 and 31. The pusher-fingers, formed by forward and downwardly projecting rods, as seen in Figs. 2 and 3, are adjustably secured, by means of the split and lugged ring 122, to which said fingers are attached by the set-screw 123, on a bar 124, so that said fingers may be placed at any desired distance apart, and also at any desired height. Said bar 124 is an extension of a carriage 125, which is to be guided by its slide-bar 126, moving through ways in stands 128, supported from the table, and also running, by one portion of its under side, on a friction-roller 129, suitably hung therefor.

On the rocker-shaft $j$ (see Fig. 2) is a bell-crank lever $r$, to one arm 131 of which is connected a rod 132, the other end of which engages with the main-shaft cam 133, and to the free end of the other arm 134 of the bell-crank lever $r$ a connecting-rod 135 is pivoted, the other end of which rod being attached, as at 136, to the finger-supporting carriage, it plainly appearing from the above that on the rotation of the properly adjusted and timed cam 133 the fingers will at the proper instant force the blank in to be engaged by the carrier-tapes.

As particularly seen in Fig. 10, which is a view in detail of the separator-slide in its forward-projected position in relation with that of the feeder-fingers, the outer end 140 of the separator-slide is made lower than the more rearward portion 141. The slide, when forward, lies by the end 140 just at the left of the right-hand finger R, and the left-hand pusher-finger is adjusted at a height just above the plane of the travel of the upper face of the end 140, so that when the separator-slide recedes its outer end may pass freely under the end of the left-hand feeder-finger. The blank when resting on the separator-slide will be in a slightly-inclined plane, as indicated in said Fig. 10.

Guide-rods 142 142 are adjustably attached on a horizontal bar 143, which is supported from a stationary part of the machine, so that they will occupy positions over the separator-slide when forward, and a blank thereon, whereby the blank, when forced forward, will, to a certain extent, be guided by said rods 142 and prevented from cockling. The envelope-blanks, successively gummed and fed in to the carrier-tapes K L, are thereby carried over and around the drums and idlers G H H², and emerge more or less vertically from between the tapes at the rollers 32 33, and are downwardly guided by a series of guide-fingers $t$, supported on the rear table D, to the action of the mechanism for receiving the gummed and dried blanks, to be now described. A supplemental table T rests by suitably-disposed holes over screw-threaded studs 145, adjusting-blocks 146, of varying heights, being placed between said table and the table D, so that the supplemental table may be placed at varying heights, as desired in the use of the machine for envelope-blanks of varying sizes. The said table is firmly secured in place as desired by the set-screws 147, and supported on said table T are two arc-shaped rails $u$ $v$, held above and parallel with the face of said table by the risers 148. In advance of the inner end of the said rails are a series of vertical fingers 149, carried on a block 150, which is adapted to move in horizontal ways under said table T backward and forward, so that the fingers 149 will pass between and behind the said stationary fingers $t$, and also forward, thereof a suitable distance, said fingers extending a short distance above the surface of the table T, the said table being cut out therefor, the reciprocating motion being imparted to said block 150 by the connecting-rod 151, secured by one end thereto and by its other end to one end of the bell-crank lever 152, to the other end of which is pivoted one end of a connecting-rod 153, which by its other end is secured to the end 154 of a two-armed lever intermediately hung on a cross-rod 155 of the machine, and to the other end 156 of the said two-armed lever is secured a rod 157, passing therefrom to an engagement with the main-shaft cam 158.

U represents a horizontal bar provided with a series of forward and downwardly extending fingers 160, arranged opposite the openings between the said guide-fingers $t$, and a compound motion is imparted to said finger-carrying bar U by the following-described connecting parts: Said bar is carried at the forward end of an arm 162, pivoted at its rear end to the upper end 163 of a lever 164, intermediately pivoted on a bracket 165 of the rear table D, and a connecting-rod 166, pivoted to the lower end 167 of said lever 164, passes forward to an engagement with a cam 168 on the main shaft. There is also pivotally connected to an intermediate portion of the finger-carrying arm 162 one end of a connecting-rod 169, which by its other end extends downwardly to engage one end 170 of an angular lever, which is intermediately hung on the cross-rod 155, its other end 171 being pivoted to the rear end of a rod 172, extended forward to engage the cam 173 on the main shaft. Through the action of the former of these two last-described connections the finger-lever receives a forward and backward motion, and through the latter-described connections it receives an up-and-down motion, the finger-bar, under the action of these connections, having a movement similar to the eccentric motion. At the rear side of the forward end of the rail $u$ is a horizontal evener-rod $w$, playing at about right angles to the line of said rail through suitable stationary bearing-lugs 174, supported on the frame, said evener-rod being provided with an enlarged flat-faced head 175 at its inner end. A periodical reciprocating motion is to be imparted to said evener-rod by any desired mechanism, the same in the present instance consisting in an arm 176 of a bell-crank lever, engaging by its outer end the said evener-rod, the bell-crank being hung to swing on an arbor 177, supported below the rear table, and a connecting rod 178 by one end engages its other end 179, said connecting-rod by its lower end being pivoted to one end of an angular lever 180, intermediately hung on the cross-rod 155, to the other end of which a connecting-rod 181 extends forward to an engagement with a cam 182 on the main shaft. As each blank issues from the carrier-tapes and passes downwardly along the guide-fingers $t$, with its gummed flap toward the curved rail $v$, describing the arc of the greater circle, it is, under the then forward throw of the evener-rod $w$, forced into its upright position, so that the inner lower corner of its seal-flap rests upon and against the rail $v$, and so that the end of the opposite flap lies just within the line of the inner face of the other rail. The lower series of fingers 149 and the upper series of fingers 160, at this time being in their forward positions, move rearwardly, carrying therewith the blank in substantially a vertical plane, and by its upper edge the blank is forced behind the leaves 183 of a series of hinges 184, and by its lower edge to the rear nose of one or more dogs 185, pivoted in the table, weighted so that said rear noses will normally lie above the surface thereof, but be depressed by the pressure of the edge of the blank thereon, the said hinge-leaves and dogs serving as detents for the blank or a series thereof against their falling forward either by their upper or lower edges, and said blanks are held against rearwardly falling by the bearing against the rearmost thereof of a pusher-plate 186, carried by an arm 187, radially arranged in relation to and pivoted in the center of the circle of which said rails form concentric arcs, a tension being given to said pusher-plate by a weighted cord 188, being secured to and passing over and around a pulley 189 on its pivotal stud in a common manner. As the length of the bunch of gummed blanks increases, such bunch is backed around on the said guide and supporting rails $u\ v$ against the said pusher-plate, the increased length of the bunch at the gummed end thereof being accommodated by the increased length of the relatively-adjacent arc-shaped rail.

As will be particularly noted on reference to Fig. 11, each drum may have a slightly-stepped peripheral conformation—that is, the side 190 thereof may be higher than the intermediate tape-bearing portion 191, and the portion 192 thereof beyond said tape-bearing portion is lower than said latter portion, all so that the envelope-blank carried between the tapes will by its gummed flap lie firmly in contact with the steam-drum with the gummed side away from its periphery, while the opposite end of the blank will not lie in contact with the drum; and under this construction of the drum, while the gummed flap of the blank will receive the maximum amount of heat from the drum, the opposing end or flap will not be heated to such a degree as to cause it to curl or warp, as would be the case were such ungummed end presented to a firm contact with the heated drum. Many of the parts are to be interchangeable and removably adjustable, so that different sizes of blanks may be gummed and dried by one machine. Notably, the table M and picker may be substituted by others of different sizes. The feeder-fingers R may be correspondingly adjusted, as also the guides 142 and the forward end portion 140 of the separator-slide, and at the rear of the machine one of the arc rails may be set and confined in a different parallel line with the other by unloosening the bolts securing the feet of the risers 148 to the table T, as seen in Figs. 2 and 13, arranging said rails in their desired position by moving the risers and again securing the feet thereof to the table T, the provision of the slots shown in the table, Fig. 2, permitting the fastening of the bolts of the riser-feet at varying points.

By the passage of the blanks carried between the tapes around the cylindrical drums and idlers, as described, they are made to conform to the convexity of the said drums, so that any tendency the blanks might have to roll in directions at right angles to the drum conforming curves thereof, especially at the gummed flap ends, will be prevented.

The mechanism at the rear of the machine, described for maintaining the envelope-blanks in an evenly-disposed bunch, is particularly designed for so maintaining blanks of substantially the shape shown in Fig. 12, and 194, Fig. 13, and while the machine may have certain of its parts conformed and adjusted so that the common diamond-shaped blank may be similarly gummed and dried, and while the present bunching mechanism might be conformed to practically operate thereon, still for blanks of the latter-mentioned form an entirely different series of mechanism is to be substituted for that hereinabove described as located at the rear of the rollers 32 and 33, and while the platen-elevating mechanism, herein described as combined with the other co-operating parts of the present machine, is a most practical and desirable one, its use is not to be limited in any way in such connection, for, as will be apparent, it may be used in many of the already well-known envelope-machines in preference to the elevating mechanisms now used therein, as it is simple, free, and certain in its operation, and embraces no parts or constructions to be seriously affected by wear.

The number and arrangement of the drums shown and described are most desirable and advantageous ones; but, if desired, more or less thereof in number may be used, and the arrangement thereof with relation to each other and with the idlers H may be changed more or less from that shown; but in all cases it is intended to so provide idler-drums narrower than the drums G, so that the tapes may carry the gummed sides of the blank-flaps always in the same outward relation to said steam-drums.

What I claim as my invention is—

1. In an envelope-machine, the combination, with an automatic blank-elevating mechanism, of a reciprocating picker, a reciprocating separator-slide, a blank-detacher, reciprocating feeder-fingers, a series of rotatable drier-drums and idler and guiding rollers, and the carrying-tapes K and L, disposed about said drums and rollers, all arranged for operation substantially as and for the purpose described.

2. In an envelope-machine, the combination, with an automatic blank-elevating mechanism, of a reciprocating picker, a reciprocating separator-slide, a blank-detacher, reciprocating feeder-fingers, stationary guide-rods, as the ones 142, a series of rotatable drier-drums and other idler and guiding rollers, and the carrying-tapes K and L, disposed about said drums and rollers, all arranged for operation substantially as and for the purpose described.

3. As an improvement in envelope-machines, the following instrumentalities in combination: carrying-tapes for envelope-blanks, guide-fingers, substantially as described, for directing the course of blanks expelled from said carrier-tapes and supporting same in an upright position, blank-guiding rails, fingers capable of an up-and-down and forward-and-backward motion for engaging blanks by their upper portions and withdrawing them from their upright position adjacent the tapes, one or more reciprocating fingers acting in conjunction with said first-named fingers for similarly acting on said blanks at the lower portions thereof, and detent devices for maintaining the tops and bottoms of withdrawn blanks against retrograde movements, substantially as described.

4. As an improvement in envelope-machines, the combination, with the carrying-tapes, of guide-fingers, substantially as described, for directing the course of blanks expelled from said tapes and supporting same in an upright position, blank-guiding rails, and an evener device adjacent the point of issue of blanks from the carrying-tapes and having its movement across the direction of travel of said blanks, substantially as described.

5. In combination, the rocker-shaft 53, provided with the radial arm 55 and the connecting-rod h, by its lower end engaging with the actuating-cam and provided at its upper end with the slot 75, the pin 76, passing through the end of said arm 55 and the said slot, a spring applied in relation to said rod and arm to exert a pressure therebetween in the manner substantially as described, the picker, and the crank-and-link connection between same and said rocker-shaft, the loose collar 68 on said rocker-shaft, provided with the horn 71, and the radial arm 67, and the spring 74, applied thereon, and the radial horn 73 on said rocker-shaft, a swinging arm 63, and means, substantially as described, for securing its rock, a worm-shaft N, provided with a ratchet-wheel 44, a swinging plate 46, with a spring-pallet, and a connecting-rod 64, having by one end a motion losing engagement with said arm 63 and provided with an abutment-pin 29, located in the line of swing of the arm 67, and by its other end engaging the said pallet-carrying plate, substantially as and for the purpose described.

6. In combination, the rocker-shaft 53, provided with the radial arm 55 and the connecting-rod h, by its lower end engaging with the actuating-cam and provided at its upper end with the screw-threaded portion and nut 80, the slot 75, the stirrup-frame 78, and the pin 76, passing through the end of said arm 55, the ear-pieces of said stirrup-frame, and the said slot, a spring applied between said nut and stirrup-frame, the picker, and the crank-and-link connection between same and said rocker-shaft, the loose collar 68 on said rocker-shaft, provided with the horn 71, and the radial arm 67, and the radial horn 73 on said rocker-shaft, a swinging arm 63, and means, substantially as described, for securing its rock, a worm-shaft N, provided with a ratchet-wheel 44, a swinging plate 46, and a spring-pallet, and a connecting-rod 64, having by one end a motion losing engagement with said arm 63 and provided with an abutment-pin 29, located in the line of swing of the arm 67, and by its other end engaging the said pallet-carrying plate, substantially as and for the purpose described.

7. In combination, the rocker-shaft 53, provided with the radial arm 55, and the connecting-rod h, by its lower end engaging with the actuating-cam and provided at its upper end with the slot 75, the pin 76, passing through the end of said arm 55 and the said slot, a spring applied in relation to said rod and arm to exert a pressure therebetween in the manner substantially as described, the picker, and the crank-and-link connection between same and said rocker-shaft, the loose collar 68 on said rocker-shaft, provided with the horn 71, and the radial arm 67, and the radial horn 73 on said rocker-shaft, a swinging arm 63, and means, substantially as described, for securing its rock, a worm-shaft N, provided with a ratchet-wheel 44, a swinging plate 46, and a spring-pallet, a connecting-rod 64, having by one end a motion losing engagement with said arm 63, and provided with an abutment-pin 29, located in the line of swing of the arm 67, and by its other end engaging the said pallet-carrying plate, and the platen-carrying uprights moving in suitable vertical ways provided with a projection adapted to have a fixed engagement with said worm-shaft and to be released from such fixed engagement, substantially as and for the purpose described.

8. The combination, with a worm-shaft N, capable of a gradual rotation, of the uprights 40, carrying the blank-supporting table arranged to move in suitable ways, and provided with a worm-wheel mounted in bearings therein meshing into said worm-shaft, and latching devices applied in relation to said worm-wheel, whereby the same may be immovably fixed in relation to said uprights and may be released for a rotation thereon, substantially as and for the purpose described.

9. The combination, with a worm-shaft N, capable of a gradual rotation, of the uprights 40, carrying the blank-supporting table provided with the brackets 83, the worm-wheel 81, and the arbor 82, to which it is fixed, having bearings in said brackets and provided with the fixed ratchet 84, and a spring-pawl 85, pivoted on one of the said uprights and engaging said ratchet-wheel, substantially as and for the purpose described.

10. The combination, with a worm-shaft N, capable of a gradual rotation, of the uprights 40, carrying the blank-supporting table provided with the brackets 83, the worm-wheel 81, and the arbor 82, to which it is fixed, having bearings in said brackets and provided with the fixed ratchet 84 and the hand-wheel 94, the spring-pawl 85, pivoted on one of the said uprights engaging said ratchet-wheel and provided with the extension 91, and the lever comprising the arms 89 and 93, the former having the incline 90, engaging said extension 91, substantially as and for the purpose described.

11. In an envelope-machine, the combination, with the frame 110 and the picker-gumming roller n, carried thereby, said frame being pivoted at its upper end to a stationary support and rigid between such pivotal point and the said roller, of a bell-crank lever, and a connecting-rod 112 between one arm 113 of said bell-crank lever and an intermediate portion of said frame 110, and a connecting-rod 116, by one end pivoted to the arm 115 of said bell-crank lever and by its other end adapted to engage an actuating-cam, substantially as and for the purpose described.

12. In an envelope-machine, in combination, the separator-slide O, provided with the rack-bar i, adapted to move in horizontal ways, a shaft 103, provided with a gear 102, engaging said rack-bar, and a pinion 104, the cam 107, the vertically-guided rack 105, and the connecting-rod between and engaged with said cam and said rack 105, substantially as and for the purpose described.

13. In an envelope-machine, the combination, with the vertically-reciprocating picker P, of a detacher-arm Q, at its rear end pivoted on a suitable fixed support, the actuating rotary cam 120, and the connecting-rod 119, at one end in engagement with said cam and by its other end pivoted to an intermediate portion of said detacher-arm, as shown.

14. The combination, with the carrier-tapes K L, and with means, substantially as described, for conveying blanks one at a time to and supporting them opposite the point for entrance between the carrying-tapes, of the carriage 125, suitably guided for a reciprocating motion in and in the reverse of the general direction of feed of said carrier-tapes, provided with the feeder-fingers R R, extending across the plane of support for said blanks, as above specified, and means, substantially as described, for reciprocating said feeder-finger carriage, substantially as described.

15. In combination, the bar U, provided with the forward and downwardly extended fingers 160 and the arm 162, to which said bar U is attached, the intermediately-pivoted lever comprising the arms 163 167, the former being pivoted by its end to the rear end of said arm 162, the actuating-cam 168, and the connecting-rod 166 between same and said arm 167, the lever comprising the two arms 170 171, intermediately pivoted, the connecting-rod 169 between the end of the arm 170 and an intermediate portion of said arm 162, an actuating-cam 173, and a connecting-rod 172 between same and the end of said arm 171, substantially as described.

16. The combination, with the bar U, provided with the forward and downwardly extended fingers 160, to which back-and-forth and up-and-down motions are imparted in the manner substantially as described, of the carrier-block 150, below said finger-bar U, adapted to slide in horizontal ways and provided with vertical fingers 149, the two-armed lever 152, and a connecting-rod 151 between one end thereof and the said carrier-block, the cam 158, and connections, substantially as described, between same and the other arm of said two-armed lever 152, whereby said lever is swung to impart a reciprocating motion to said carrier-block, substantially as described.

17. A steam-drum for the purpose described, having its peripheral surface at one side of its intermediate portion raised and at the other side thereof depressed, substantially as shown and described.

18. The combination, with a frame E, provided with bearings 16, of a series of cylindrical chambered drums having extended hollow hubs 15, closed at their outer ends and provided with ports 22, the steam-pipes 19 at each end of said drums, which are in communication with common supply and exhaust pipes 20 21, said pipes 19 being provided with chambered boxes 18, through which said hubs 15 pass and bear for a rotation thereon, a gear 17 on one hub of each of said drums, and gears intermediate of said drum-gears, and a gear on the driving-shaft, all substantially as and for the purpose described.

CHAS. H. HEYWOOD.

Witnesses:
WM. S. BELLOWS,
H. A. CHAPIN.